US 6,710,866 B1

(12) United States Patent
Adolph

(10) Patent No.: US 6,710,866 B1
(45) Date of Patent: Mar. 23, 2004

(54) DEVICE FOR DETERMINING WHEEL AND/OR AXLE GEOMETRY OF MOTOR VEHICLES

(75) Inventor: Dietrich Adolph, Albershausen (DE)

(73) Assignee: Robert Bosch GmbH, Stuttgart (DE)

(\*) Notice: Subject to any disclaimer, the term of this patent is extended or adjusted under 35 U.S.C. 154(b) by 0 days.

(21) Appl. No.: 10/048,098

(22) PCT Filed: Jul. 14, 2000

(86) PCT No.: PCT/DE00/02312

§ 371 (c)(1),
(2), (4) Date: Jun. 7, 2002

(87) PCT Pub. No.: WO01/07862

PCT Pub. Date: Feb. 1, 2001

(30) Foreign Application Priority Data

Jul. 24, 1999 (DE) .......................................... 199 34 864

(51) Int. Cl.⁷ .............................. G01B 11/26; G01B 5/24
(52) U.S. Cl. ................................ 356/139.09; 33/203.18; 33/288
(58) Field of Search .................. 356/139.09; 33/288, 33/203.18

(56) References Cited

U.S. PATENT DOCUMENTS

| | | | |
|---|---|---|---|
| 5,054,918 A | * | 10/1991 | Downing et al. |
| 5,532,816 A | * | 7/1996 | Spann et al. ............ 356/139.09 |
| 5,724,129 A | * | 3/1998 | Matteuci ................ 356/139.09 |
| 5,809,658 A | | 9/1998 | Jackson et al. |
| 5,818,574 A | * | 10/1998 | Jones et al. ............ 356/139.09 |
| 6,404,486 B1 | * | 6/2002 | Nobis et al. ........... 356/139.09 |

FOREIGN PATENT DOCUMENTS

DE    197 57 760    7/1999

\* cited by examiner

Primary Examiner—Stephen C. Buczinski
(74) Attorney, Agent, or Firm—Kenyon & Kenyon

(57) ABSTRACT

A device for determining the wheel and/or axle geometry of motor vehicles in a measuring space, using an optical measuring device having at least two image recording devices, which records from at least two different perspectives a marking device including a plurality of wheel features arranged on a wheel, at least one vehicle body feature and a reference feature array having at least three reference features offset in at least one plane, and having an evaluation device, the position of the reference features in the measuring space being known to the evaluation device, the recording of the marking device taking place during the passage of the motor vehicle and the axis of rotation of a measured wheel being ascertained by the simultaneous recording of the wheel features and of the at least one vehicle body feature at a plurality of points in time in the measuring space. In a simplified design, the determination of the wheel and/or axle geometry is made easier by determining the vertical direction in the measuring space from the position of reference features in the measuring space, by ascertaining the direction of the axis of travel of the motor vehicle in the evaluation device on the basis of recording the marking device separately for each wheel from a track of motion of the at least one vehicle body feature, and by determining the position of the axis of rotation of the wheel with respect to the vertical direction and the direction of the axis of travel.

5 Claims, 2 Drawing Sheets

DEVICE FOR DETERMINING WHEEL AND/OR AXLE GEOMETRY OF MOTOR VEHICLES

FIELD OF THE INVENTION

The present invention relates to a device for determining the wheel and/or axle geometry of motor vehicles in a measuring space, using an optical measuring device having at least two picture recording devices which, from at least two different perspectives, record a marking device including a plurality of wheel features arranged on a wheel, at least one vehicle body feature and a reference feature array having at least three reference features offset at least in one plane, and having an evaluation device, the position of the reference features in the measuring space being known in the evaluation device, the recording of the marking device taking place as the motor vehicle travels past, and the axis of rotation of a measured wheel being ascertained in the measuring space by simultaneous recording of the wheel features and of the at least one vehicle body feature at a plurality of points in time.

BACKGROUND INFORMATION

Such a device is known from German Patent No. DE 197 57 760 A1. Using several cameras, reference feature equipment and features or marks on the vehicle wheels and the vehicle body, the position of the wheel axles can be determined in a measuring space. The positioning of the reference features is known in the evaluation device. The evaluation uses the known methods of triangulation. This known examination method provides that the wheels shall travel past the measuring space. The camber of the wheel axles refers to the vertical line, and, provided this designated direction is known in a system of three-dimensional axes, it can be given for each wheel.

Things are different with the single toe of the wheels. The reference direction here lies in a plane perpendicular to the vertical, i.e. usually parallel to the floor of the test locale. The significant direction here is the travel axis, which is defined as the bisector of the single toes of the unsteered wheels.

Thus, for determining the single toes of the steered front wheels, it was customary up to now first to ascertain the travel axis by measuring the single toes of the rear wheels. Only then were the front wheels measured.

SUMMARY OF THE INVENTION

The present invention is based on the object of providing a device which yields a simpler determination of the wheel and/or axle geometry of motor vehicles using a simplified design.

According to the present invention, the vertical direction in the measuring space is determined from the position of the reference features in the measuring space, the direction of the travel axis of the motor vehicle is ascertained in the evaluation equipment on the basis of the recording by the marking device, separately for each wheel, from the path of motion of the at least one vehicle body feature, and the position of the axis of rotation of the wheel is determined with respect to the vertical direction and the direction of the travel axis.

Simply using these measures, the vertical direction and the direction of the travel axis are ascertained during passage of the vehicle, using a measuring device provided at one wheel, and from these, then, without measurements at further wheels, the data on the wheel and/or axle geometry of the respective wheel are obtained. Using the ascertained position of the wheel's axis of rotation, it is easy to determine, for example, the camber as angle to the vertical and the single toe of the respective wheel as angle to the travel axis, without having to ascertain the travel axis as bisector of the nonsteered wheels.

The wheel axis can be determined exactly by obtaining the axis of rotation of the wheel during the passing of the vehicle by recording the individual rotary tracks of several wheel features, the translational motion of the motor vehicle, determined from the track of motion of the at least one vehicle body feature, being eliminated. From this one can calculate a rim runout compensation or compensate for the influence of similar disturbance variables. The exact plane of rotation of the wheel also becomes known from this.

The simple system is further favored by the fact that, for the purpose of ascertaining the vertical direction, the arrangement of the reference feature is suspended leveled out in a position at rest. If a plurality of reference features of the reference feature arrangement lie vertically above one another, the vertical direction can be determined particularly easily.

Changes in position of the vehicle with respect to the reference feature arrangement, which appear, for example, with steering angles for measuring and setting the axis geometry at the steered wheels or for ascertaining the position of the pivot pin, become noncritical because the direction of the axis of travel and/or the vertical direction are referred to a coordinate system related to the vehicle body, several vehicle body features being used for the parameter transformation. When the coordinate system related to the vehicle body is known, the change in position of the vehicle with respect to the reference feature arrangement does not take effect. A further advantageous development is that a test site for measuring of a steered wheel is provided, at which the measuring is done on the basis of the coordinate system related to the vehicle body.

DETAILED DESCRIPTION

Figure 1:
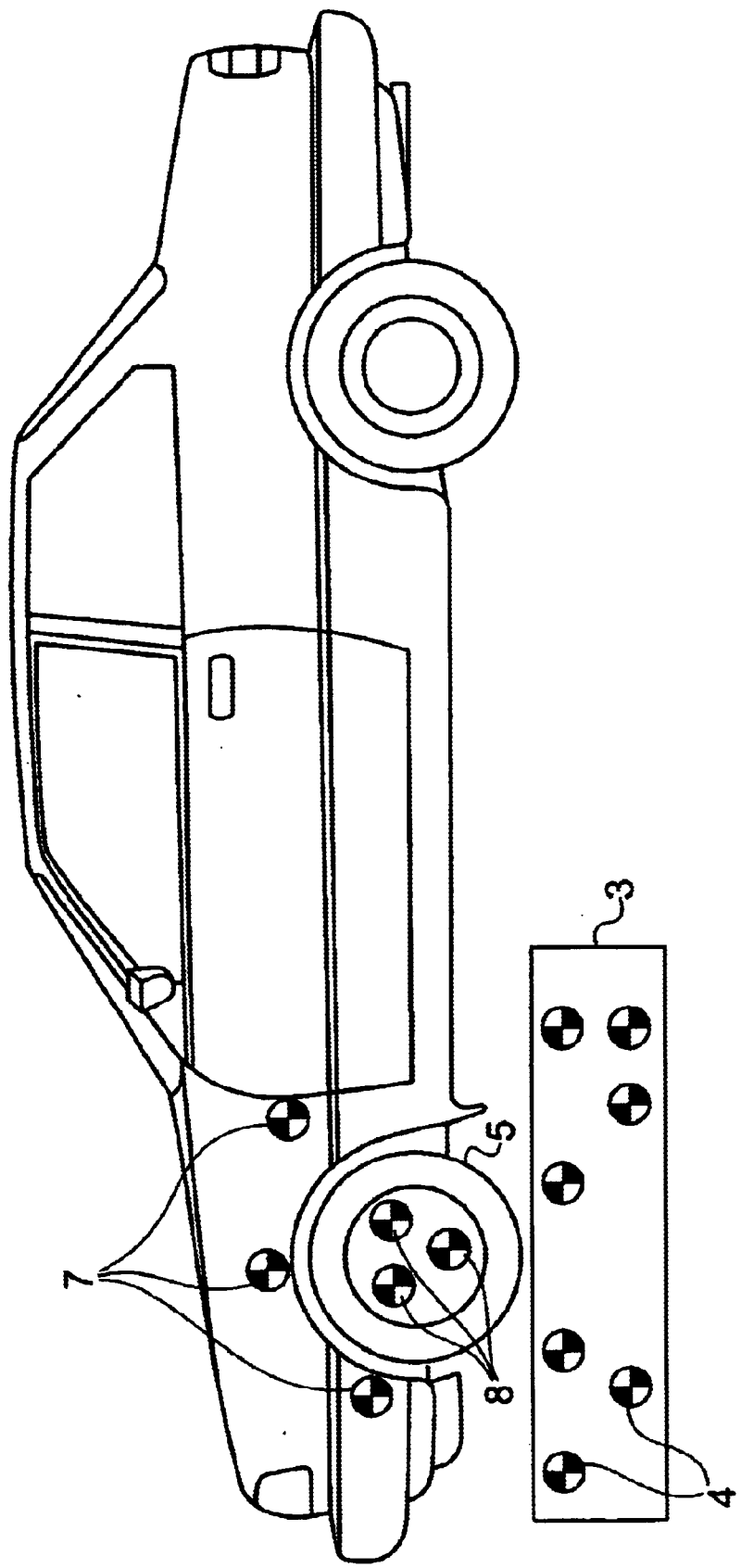
FIG. 1 illustrates the vehicle body features, wheel features and reference feature arrangement according to the present invention.
Figure 2:
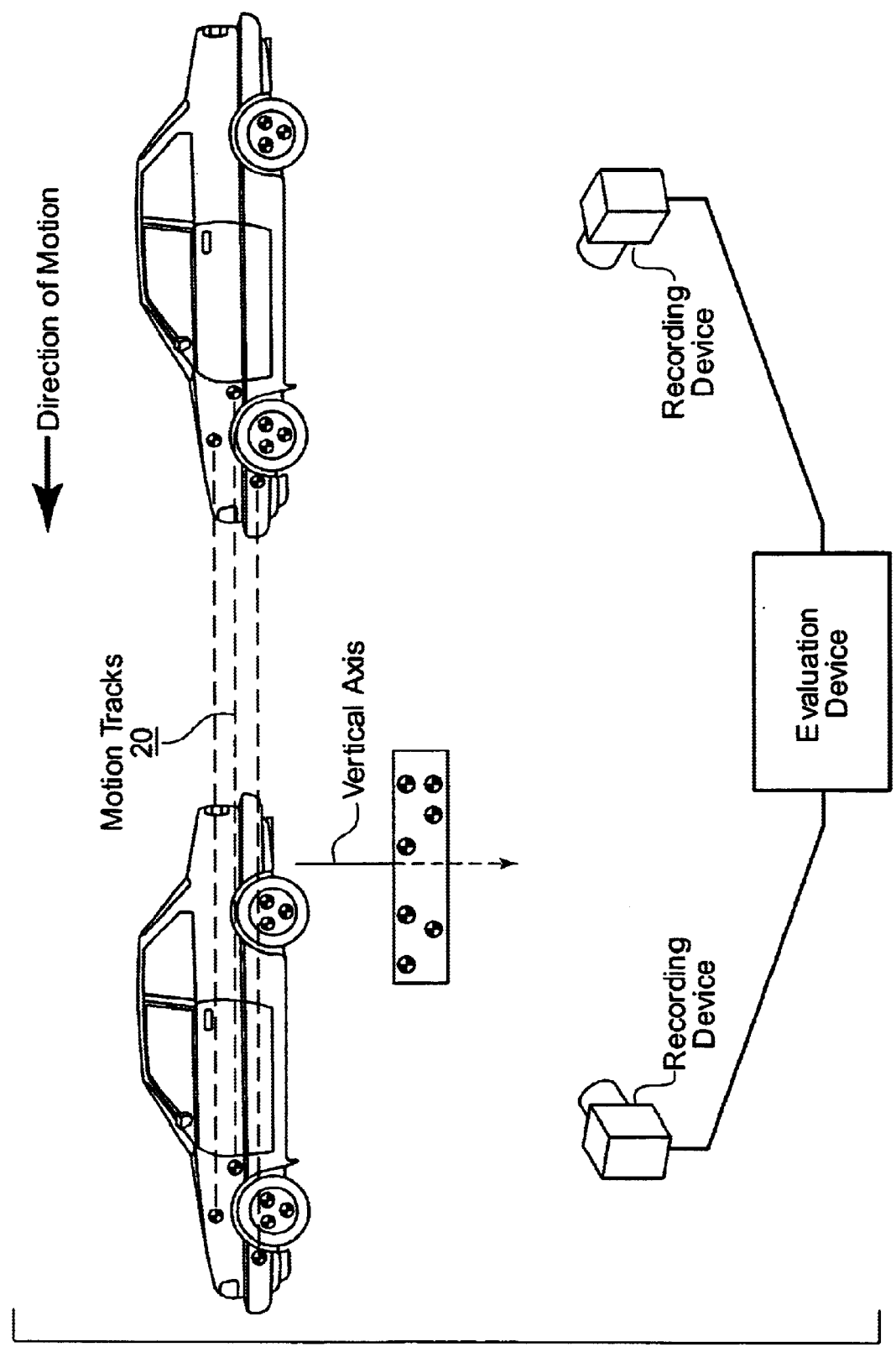
FIG. 2 illustrates the device for determining wheel and/or axle geometry according to an embodiment of the present invention.

FIG. 1 shows a motor vehicle having a plurality of vehicle body features 7 arranged in the vicinity of front wheel 5, offset in the plane of projection of the front vehicle body region, a plurality of wheel features 8, likewise offset in the plane of projection and arranged at wheel 5, as well as a reference feature arrangement 3 at a distance from the vehicle having a plurality of reference features 4, likewise offset in the plane of projection. In this case, reference features 4, wheel features 8 and vehicle body features 7 can additionally be offset spatially from one another. The reference features 4, the wheel features 8, as well as the vehicle body features 7 are all simultaneously recorded together from at least two different perspectives and at several points in time during passage of the motor vehicle, using an appropriately arranged optoelectronic measuring device having at least two image recording devices as shown in FIG. 2.

In order to establish, for example, the vertical direction essential for determining the camber of the respective wheel, a test body is measured which is suspended freely movable as a pendulum (calibrating pendulum). This test body can be, for example, reference feature arrangement 3 suspended as a pendulum as shown in FIG. 2. From the position of rest of the pendulum in the space the vertical direction sought after can be easily determined. Pendulum markings are fastened to the pendulum, for instance, along a straight axis of symmetry, so that the vertical line can actually be recognized directly from the position of the pendulum markings. In another arrangement of the pendulum markings, the vertical line is easily ascertained using an evaluating device that is in connection with the optoelectronic measuring device. Expediently, all coordinates of reference feature arrangement 4 are transformed from now on in such a way that an orthogonal coordinate system is produced, having the vertical line as one of its main axes. The remaining two axes then describe a plane in which toe angles are defined. This is based on the supposition that the plane is parallel to the test site floor.

During passage of the motor vehicle past the measuring device, all points of the vehicle body are moving, including particularly vehicle body features 7, on a motion track parallel to the axis of travel, since, indeed, wheel angles are not allowed during passage of the vehicle, and such vehicle movements could possibly be recognized and the measurements eliminated. While wheel features 8 move in cycloidal paths during the passage of the vehicle, the tracks of vehicle body features 7 in the measuring space are nothing but parallel straight lines. The tracks of the vehicle body features 7 are shown as motion tracks 20 in FIG. 2. Projected onto the test site floor, they supply the direction of the axis of travel. Thereby is made available directly a reference direction for ascertaining the wheel single toe. If the method is used for the unsteered rear wheels, this yields a simple possibility for checking the procedure. For this step in the determination of the direction of the travel axis, in principle, a single vehicle feature 7 near the respective wheel 5 is sufficient.

Using several wheel features 8, the position of the axis of rotation of wheel 5 can be accurately determined during passage of the vehicle, using the measuring device and the evaluation device, the cycloids of each wheel feature 8 being evaluated, and the orbit of each wheel feature 8 being separated from the linear motion known from the recording of the vehicle body features 7, so that only the orbital motions of the wheel features 8 remain. Thereby is obtained the exact plane of rotation of wheel 5, or rather the exact position of the axis of rotation of wheel 5.

During the complete measuring of a steered wheel 5, and also during the ascertaining of the position of the pivot pin, steering-angle changes are made on the wheel. For this purpose, wheel 5 travels to a location on the test site at which these steering-angle changes can be made with as little friction loss as possible, e.g. on a ball bearing supported rotating plate or a location treated with lubricating or sliding medium. Also by lifting the vehicle body to such an extent that wheels 5 can be steered relatively free of force, friction losses are avoidable to a considerable degree. In this connection, it is important for the axis measurement that, besides the vertical direction, the direction of the axis of travel is also known. During the measurement taken now, the vehicle no longer moves. That is how the axis of travel is already ascertained during travel to the designated location, using the method described above. Then the direction of the axis of travel is known, to be sure, with respect to the test site, but it cannot be used directly during the steering angles, since partially considerable lateral movements of the vehicle are connected with the steering angles. The problem is now solved in that, before carrying out the steering angles, the travel axis determined before is referred to a vehicle body-related coordinate system. The vehicle body features 7 mentioned are used for the required parameter transformation. As few as one or two vehicle body features 7 are sufficient for the determination of the direction of the axis of travel, it being favorable if these (features) are somewhat distant from each other in the longitudinal direction of the vehicle. Naturally, a more exact decription is possible if more than two vehicle body features 7 are drawn upon. During the steering angle, all the motions in the horizontal direction can now be referred to the ascertained direction of the axis of travel in the vehicle body type coordinate system.

According to this, using the described measures, a complete measuring of a steered wheel 5 can be made using only one measuring device for only one wheel with a view to measuring the customary wheel and axle geometries. Besides the direction of the axis of travel, the vertical direction can also be correspondingly transformed into the vehicle body-related system, whereby the reference coordinate system is no longer required for further settings, and corresponding setting work can be carried out, for example, on a lifting platform.

What is claimed is:

1. A device for determining at least one of a wheel geometry and an axle geometry of a motor vehicle in a measuring space, comprising:

an optical measuring device including at least two image recording devices, which records from at least two different perspectives a marking device including a plurality of wheel features arranged on a wheel, at least one vehicle body feature and a reference feature array having at least three reference features offset in at least one plane, wherein the recording of the marking device takes place as the motor vehicle travels past; and an evaluation device ascertaining an axis of rotation of a measured wheel by a simultaneous recording of the wheel features and of the at least one vehicle body feature at a plurality of points in time in the measuring space, the evaluation device determining a vertical direction in the measuring space from a position of the reference features in the measuring space, the evaluation device ascertaining a direction of an axis of travel of the motor vehicle based on recording the marking device separately for each wheel from a track of motion of the at least one vehicle body feature, and the evaluation device determining a position of the axis of rotation of the measured wheel with respect to the vertical direction and the direction of the axis of travel.

2. The device according to claim 1, further comprising:

means for capturing the axis of rotation of the wheel as the motor vehicle travels past by recording individual rotary tracks of several of the wheel features, whereby a translational motion of the motor vehicle, determined from a track of motion of the at least one vehicle body feature, is eliminated.

3. The device according to claim 1, further comprising:

means for suspending the reference feature array, to ascertain the vertical direction so as to be leveled out into a position at rest.

4. The device according to claim 1, further comprising:

means for using at least one of the direction of the axis of travel and the vertical direction with reference to a vehicle body-related coordinate system, a plurality of vehicle body features being employed for a parameter transformation.

5. The device according to claim 1, further comprising:

a test site for measuring a steered wheel, at which a measurement is carried out on the basis of a vehicle body-related coordinate system.

* * * * *